H. C. REES.
LENS MOUNT AND METHOD OF FORMING SAME.
APPLICATION FILED OCT. 20, 1919.

1,430,114. Patented Sept. 26, 1922.

Inventor
H. C. REES
By Fenelon D. Brock
Attorney

Patented Sept. 26, 1922.

1,430,114

UNITED STATES PATENT OFFICE.

HERBERT C. REES, OF SAN ANTONIO, TEXAS.

LENS MOUNT AND METHOD OF FORMING SAME.

Application filed October 20, 1919. Serial No. 332,073.

*To all whom it may concern:*

Be it known that I, HERBERT C. REES, a citizen of the United States, residing at San Antonio, in the county of Bexar and State of Texas, have invented new and useful Improvements in Lens Mounts and Methods of Forming Same, of which the following is a specification.

The invention is particularly applicable for use in manufacturing lens mounts for rimless eyeglasses and spectacles, and is adaptable for use in any of the usual or acceptable constructions involving the regular strap and screw mounting of the lens. The invention contemplates particularly the utilization of a flexible and elastic washer for the mount, preferably made of compressed parchment or sheep skin, and the lens mounting produced according to my process thereafter holds the lens in correct position and at the same time permits the mount to be bent or twisted or to be subjected to strains of bending or twisting, without breaking, as will be hereinafter set forth.

I have utilized the accompanying drawings to illustrate the best mode of procedure or method I have so far devised for the physical embodiment of my invention, and for the practical application of the principles thereof.

Figure 1:
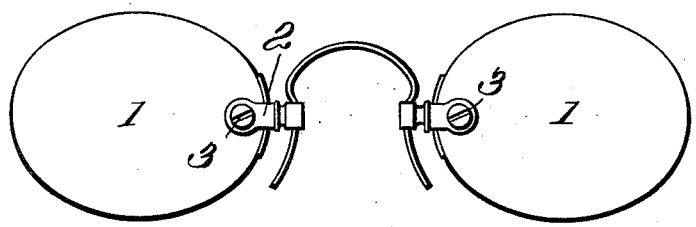

Referring to the drawings, Figure 1 illustrates a well known type of rimless eyeglass in which the mounts have been constructed according to my improved method.

Figure 2:

Figure 2 is a perspective view of a spirally wound compressed raw hide tube, from which the washers for the mount are severed.

Figure 3:
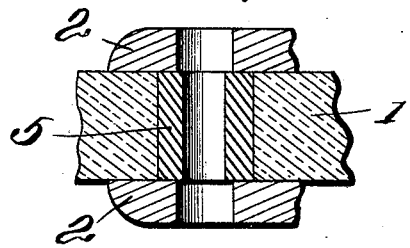

Figure 3 is an enlarged detail sectional view showing the washer in the lens before it is expanded.

Figure 4:
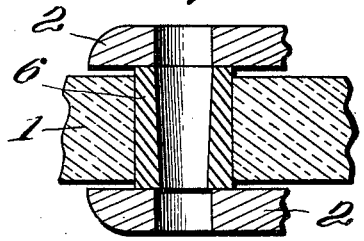

Figure 4 is a view similar to Figure 3, but here the washer has been expanded.

Figure 5:
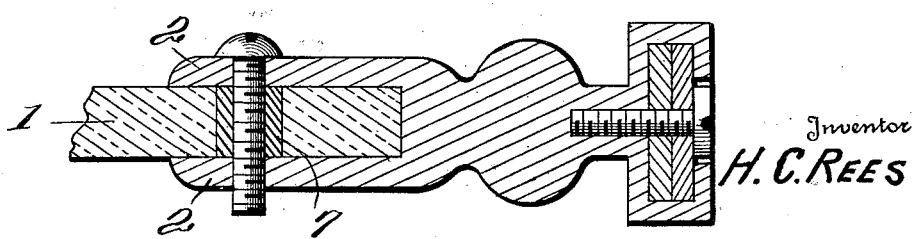

Figure 5 is a view showing the completed mount.

In order that the invention may be readily understood it may be stated that the lens 1 and strap 2 and the screw 3 are all of the usual or standard type, ordinarily found in commercial eyeglasses or spectacles, and while the invention is described and illustrated in connection with rimless eyeglasses, it will of course be understood that other types of glasses may be equipped with lens mountings according to my improved method.

In carrying out my process I utilize a raw hide tube 4 which, as seen in Figure 2, is spirally wound, and circular in cross section, and this tube, which is made according to a novel process that I have invented, has its material or substance compressed, and to some extent the moisture has been eliminated from the tube, so that the porous tube is capable of absorbing moisture unto itself.

The tube 4 is designed to be cut up into short lengths or washers, and for this purpose the end of the tube is inserted in a screw hole in the lens and while in the opening or hole in the lens the washer is severed from the tube, leaving the ends of the washer flush with the two surfaces of the lens, in order that the straps 2 may be placed in position over the lens as in Figure 3. Here it will be seen the washer 5 is held in the lens by the straps, and the next step is to expand the washer so that it will completely fill the opening in the lens.

The washer 5 is expanded radially, and also expanded longitudinally to slightly lengthen it, by the utilization of a tapering pin or tool, which is run through the washer 5 while in the lens with a result that the washer at 6 in Figure 4 is fashioned. Here, in Figure 4 the tapering pin has been withdrawn from the washer 6 and in addition to the radial expansion of the washer, the latter has been slightly elongated, so that its ends protrude beyond the faces of the lens, but are still held by the straps 2.

In concluding the process or method, the screw 3 is inserted into the mount as shown in Figure 5, and the screw turned home clamping the washer and lens between the two straps, and the washer 7 as shown forms the direct and sole support for the straps and screw. If necessary, the washer 5 may be slightly moistened before or after placing in the lens opening, in order that its body may be expanded by the tapering tube.

The washer thus encased in the lens opening completely fills the space allowed the screw, and forms an adequate support to tightly hold the lens, yet is elastic and is capable of receiving and absorbing strains from screwing up the mount too tight, or from unequal expansion and contraction of the glass of the lens and of the metal straps, this latter condition probably causing a large majority of the fractures of the lens mount.

The lens mount constructed according to my method embodies a flexibility and elasticity, due to the utilization of the compressed sheep skin washer, that enables the mount to absorb strains of bending or twisting, and yet always holds the lens in correct position. The washer of this peculiar construction also adds greatly to the strength of the mounting, and distributes the strains of twisting and bending, uniformly throughout the mounting, all of which conduce to the longevity and durability of the lens mounting.

What I claim is:

1. The method of forming a lens mount for eyeglasses which consists in placing a tube of elastic hygroscopic material in a lens opening, severing a washer from the tube, radially and axially expanding said washer in the lens, and completing the mounting.

2. The method of forming a lens mount for eyeglasses which consists in placing a tube of elastic hygroscopic material in a lens opening, severing a washer from the tube, and radially and axially expanding said washer in the lens by the insertion of a tapered pin.

3. The process of forming a lens mount which consists in inserting a tube of compressed elastic material in a lens opening, cutting off the tube even with the surfaces of the lens to form a washer, moistening the washer, and forming the washer with a tool.

4. The method of forming a lens mount for eyeglasses which consists in placing a tube of elastic compressed raw hide in a lens opening, severing the tube even with the surfaces of the lens to form a washer, radially and axially expanding said washer in the lens and completing the mount as described.

5. The method of forming a lens mount which is characterized by inserting a tube of hygroscopic material in a lens opening, cutting off the tube even with the surface of the lens to form a bushing, and inserting a strap securing element in said bushing.

6. The method of uniting a lens and strap consisting in inserting in the hole in the lens a tube of compressed raw hide, severing the tube even with the surfaces of the lens to form a washer, placing the lens between straps, moistening the washer, expanding the washer transversely and longitudinally, and tightening the parts by the insertion of the screw.

7. The method of forming a lens mount which is characterized by inserting a tube of hygroscopic material in a lens opening, cutting off the tube even with the surface of the lens to form a bushing, and inserting a strap securing element in said bushing and moistening the bushing.

8. The method of uniting a lens and strap consisting in inserting in the hole in the lens a tube of compressed rawhide, severing the tube with the surfaces of the lens to form a bushing, placing the lens between straps, tightening the parts by the insertion of a screw, and moistening the bushing.

9. A lens mounting including straps, a holding element extending through the straps and the lens, and a washer or bushing of rawhide surrounding said element.

10. A lens mounting including straps, a holding element extending through the straps and the lens, and a washer or bushing of hygroscopic material which expands when moistened surrounding said element.

11. A lens mounting including straps, a holding element extending through the straps and the lens, and a washer or bushing surrounding said element composed of hygroscopic material which expands when moistened and hardens when exposed to the air.

12. The process of forming a lens mount for eye-glasses which consists in placing a tube of moistened, homogenous excess material capable of absorbing moisture and of being affected thereby in the lens opening, and axially compressing and radially expanding said tube within the lens.

13. The process of forming a lens mount which consists in cutting a washer from a tube of homogenous material capable of absorbing moisture and of being affected thereby, inserting said washer in the lens opening, and axially compressing and radially expanding said washer within the lens.

14. The process of forming a lens mount which consists in cutting a washer from a tube of sheepskin, inserting the washer in the lens opening, then moistening the washer and axially compressing the washer to radially expand the same between the ends of the lens opening.

15. A lens mounting comprising the straps and screw and a washer capable of absorbing moisture and of being affected thereby, held under compression by said straps within the lens opening, and encasing the screw, with the ends of the washer flush with the opposite faces of the lens.

16. The method of forming a lens mount which is characterized by inserting a tube in a lens opening, severing the tube even with the surface of the lens to form a bushing in the lens opening, and inserting a strap securing element in said bushing.

HERBERT C. REES.